United States Patent [19]

Gelardi et al.

[11] Patent Number: 4,875,743
[45] Date of Patent: Oct. 24, 1989

[54] RECORDING MEDIA STORAGE APPARATUS

[75] Inventors: Anthony Gelardi, Cape Porpoise, Me.; Alan Lowry, Canton, Mass.; Craig Lovecky, Old Orchard Beach, Me.

[73] Assignee: Shape Inc., Biddeford, Me.

[21] Appl. No.: 215,357

[22] Filed: Jul. 5, 1988

[51] Int. Cl.[4] .................................. A47B 81/06
[52] U.S. Cl. ........................... 312/13; 206/309; 211/40; 312/14
[58] Field of Search ............. 312/13, 14, 15, 16, 312/18, 19, 327, 328; 211/40; 206/309, 311

[56] References Cited

U.S. PATENT DOCUMENTS

| | | |
|---|---|---|
| 895,655 | 8/1908 | Mitchell . |
| 1,004,281 | 9/1911 | Kuhn . |
| 1,188,872 | 6/1916 | Woerheide ................. 312/13 X |
| 1,252,078 | 1/1918 | Bender ........................... 312/13 |
| 1,336,382 | 4/1920 | Schlingloff . |
| 2,321,794 | 6/1943 | Braun . |
| 3,042,469 | 7/1962 | Lowther . |
| 3,102,635 | 9/1963 | Werwin et al. . |
| 3,316,039 | 4/1967 | Drobny . |
| 3,603,478 | 9/1971 | Connan . |
| 3,763,994 | 10/1973 | Somers ......................... 312/13 X |
| 4,108,511 | 8/1978 | Spragg, Jr. . |
| 4,368,934 | 1/1983 | Somers ......................... 312/14 X |
| 4,664,454 | 5/1987 | Schatteman et al. ........ 312/14 X |
| 4,702,533 | 10/1987 | Seifert . |

FOREIGN PATENT DOCUMENTS

| | | | |
|---|---|---|---|
| 181835 | 5/1986 | European Pat. Off. ............ 206/309 |
| 3440479 | 5/1986 | Fed. Rep. of Germany ...... 206/309 |
| 983552 | 6/1951 | France ............................... 206/311 |
| 94392 | 6/1969 | France ............................... 211/40 |
| 718084 | 2/1980 | U.S.S.R. ............................ 312/14 |
| 153187 | 11/1920 | United Kingdom .............. 312/13 |

Primary Examiner—Peter A. Aschenbrenner
Assistant Examiner—Thomas A. Rendos
Attorney, Agent, or Firm—Staas & Halsey

[57] ABSTRACT

An apparatus for storing a plurality of disc-shaped recording media includes a housing and a plurality of thin, substantially C-shaped lever members, each of which has an inner circumferential surface for holding a disc-shaped recording media by an outer circumferential surface of the recording media. Each lever member is pivotally connected to the housing by a pivot post and is pivotally movable into and out of the housing. A lock mechanism prevents the lever members from pivoting out of the housing, while a detent mechanism holds the unlocked lever members in either a closed or open position. The inner circumferential surface of the C-shaped lever members subtends an angle greater than 180° in order to create a spring force in two arms of the lever member, the spring force acting to hold the disc-shaped recording media on the circumferential surface of the lever member.

36 Claims, 3 Drawing Sheets

RECORDING MEDIA STORAGE APPARATUS

BACKGROUND OF THE INVENTION

1. Field of the Invention

The present invention relates generally to storage devices for recording media and, more specifically, to portable storage devices for storing and transporting compact discs.

2. Description of the Related Art

Storage devices for recording media are generally known. Disc-shaped recording media, such as compact discs (CD's), encounter special problems of handling and storage due to their delicate, flat recorded surfaces. It is preferable to handle disc-shaped recording media by their circumferential edges, which are thin, non-recorded surfaces, to avoid damaging the recorded surfaces.

Compact discs have optically readable data encoded on their flat, recorded surfaces. They are often sold in plastic CD boxes, which are sometimes referred to as "jewel" boxes. CD boxes are substantially standardized in size and shape. Most are rectangular in shape and have a mounting hub for holding the CD by its center hole. CD boxes are usually kept after purchase as storage devices for a single CD. Other types of storage devices are needed to organize and store multiple CD boxes.

While CD boxes have proven adequate for storage purposes, there is room for improvement. For example, it is sometimes difficult to remove the CD from its mounting hub, thus requiring the use of force which might damage the recorded surface. Also, CD boxes have interior surfaces which sometimes come into contact with, and thus degrade, the recorded surface of the CD.

Presently, there are no storage devices for boxes which offer a satisfactory portability feature. Due to the thickness of a CD box, it is somewhat cumbersome to carry multiple CD boxes from one location to another. Existing CD box holders are intended for stationary use, and thus, not easily converted to portable use.

U.S. Pat. No. 4,702,533 describes a device for storing flat recording media in which CD's are vertically stacked in outwardly sliding, open-topped trays. Each tray is composed of a lower portion of the original CD box, which is slidable along parallel, lateral guide rails. A locking mechanism is provided to prevent the trays from inadvertently sliding out. However, the device described in the aforesaid patent is not practical as a portable carrier since space for each CD box is required. Also, sliding tray mechanisms tend to be mechanically complex and costly to produce.

Generally, CD boxes tend to be difficult to stack and difficult to store or carry without an additional storage device or holder. Moreover, existing storage devices for storing CD boxes tend to be either bulky or impractical, or both.

SUMMARY OF THE INVENTION

An object of the present invention is to provide a recording media storage apparatus which is capable of storing a plurality of disc-shaped recording media units in a relatively small space.

Another object of the present invention is to provide a recording media storage apparatus which is capable of storing a plurality of disc-shaped recording media units without contacting the recorded surfaces of the media units and preventing adjacent media units stored in the apparatus from contacting each other.

Another object of the present invention is to provide a disc-shaped recording media storage apparatus which is capable of storing a plurality of media units, particularly CD's, in a relatively small amount of space, and which is kept stationary or carried from one location to another.

Yet another object of the present invention is to provide a recording media storage apparatus which is placed to rest on most of its surfaces, and is hand-held for removing media units therefrom.

Another object of the present invention is to provide a recording media storage apparatus which prevents disc-shaped recording media units from coming loose when in storage or while carrying the storage apparatus.

Still another object of the present invention is to provide a CD storage apparatus in which each CD stored therein is held substantially by its circumferential edge, and is removed by gripping the central circular opening and the circumferential edge of the CD, and pulling outwardly.

These and other objects of the present invention are met by providing an apparatus for storing a plurality of disc-shaped recording media, each having an outer circumferential edge, the apparatus including a housing, holder means, pivotally connected to the housing, for holding the plurality of disc-shaped recording media by the outer circumferential edges thereof, pivot means, disposed within the housing, for pivotally moving the holder means into and out of the housing, and lock means for locking the holder means in the housing. Preferably, the holder means is a plurality of thin, substantially C-shaped lever members, each of which has an inner circumferential surface holding a disc-shaped recording media thereon. Each circumferential surface has a radius substantially equal to a radius of the disc-shaped recording media. The inner circumferential surface of each C-shaped lever member subtends an angle greater than 180° so that a spring force is created in the lever member when a disc-shaped recording media is passed between first and second arm portions of the lever member. A lock mechanism locks the lever members in a closed position and also centers and supports the distal ends of the lever member arm portions when the lever members are pivoted into a closed position. Centering the distal ends helps seal the interior of the housing by creating a flush-fit between adjacent lever members. The lever members are preferably made in one-piece of flexible plastic material. A detent mechanism holds each lever member in an open or closed position, and includes a spring detent which is spring biased into engagement with one of two recesses provided on the lever member near the point of pivotal connection of the lever member.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
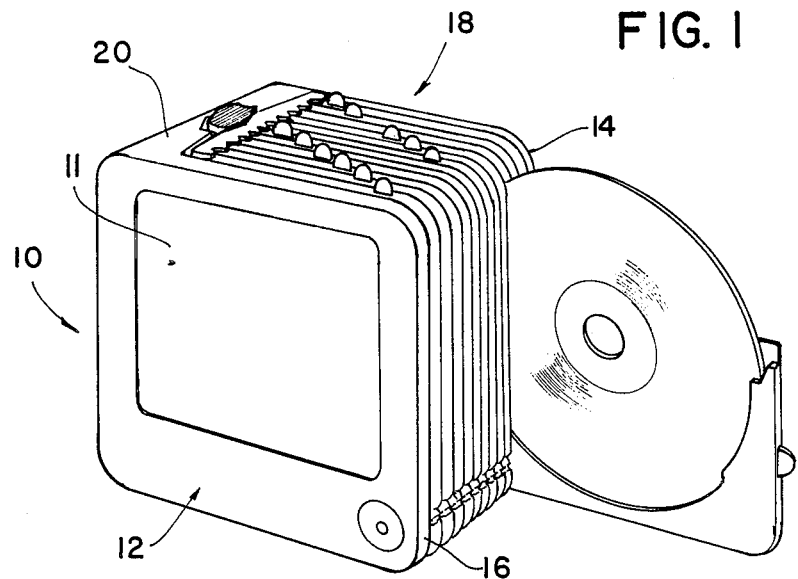
FIG. 1 is a perspective view of a recording media storage apparatus according to a preferred embodiment of the present invention.

In FIG. 1, a recording media storage unit is generally referred to by the numeral 10. A housing 12 is substantially rectangular in shape with four rounded corners. Opposite end walls 14 and 16 have holder means 18 disposed therebetween. The housing 12 has side walls 20 (partially shown in FIG. 1) between the end walls 14 and 16 except for a L-shaped opening which is closed by the flush fitting of the recording media holding lever members (to be described later) which constitute the holder means 18. For storing five inch diameter CD's, the housing 12 has a length and height of about five inches. A width of about two inches will accommodate about twelve CD's; thus, the storage unit 10 is both portable and compact. Dimensions of other sizes may be used for the storage unit 10 to accommodate disc-shaped recording media of other sizes.

Figure 2:
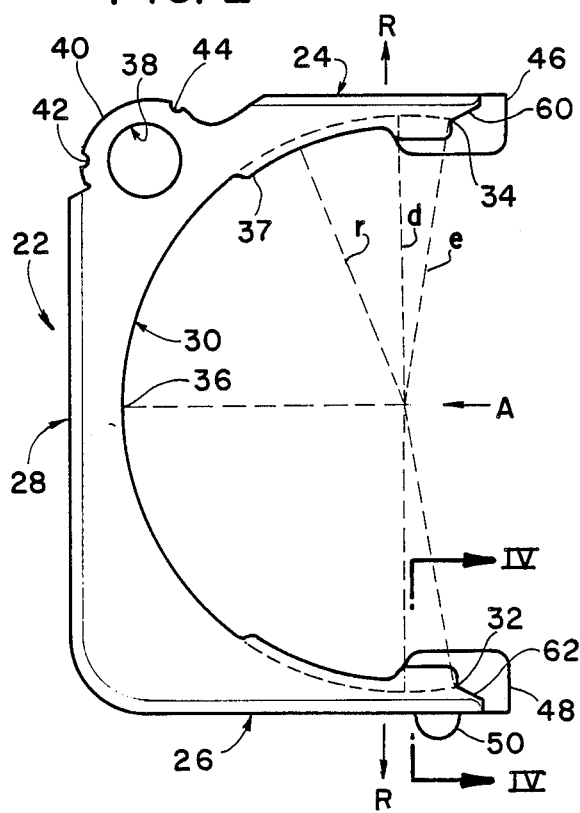
FIG. 2 is a top plan view of a recording media holding lever member according to a preferred embodiment of the present invention.
Figure 3:
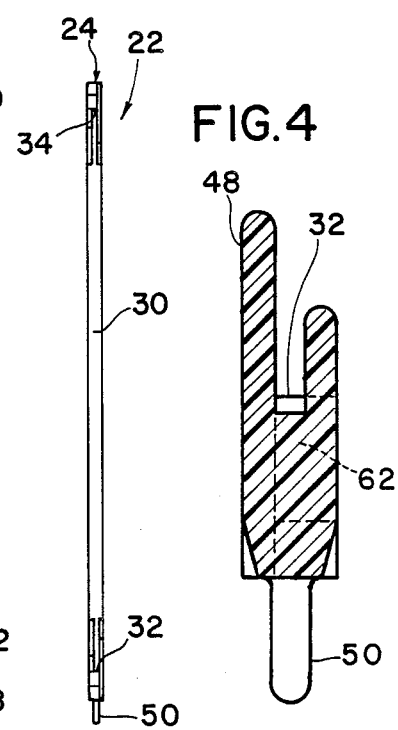
FIG. 3 is a front end view of the recording media holding lever member of FIG. 2.
Figure 4:
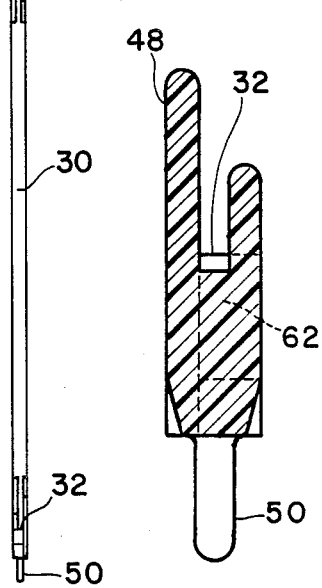
FIG. 4 is an enlarged view of an end portion of the recording media holding lever member shown in FIG. 3.

Referring to FIGS. 2-4, the holder means is preferably a plurality of thin, substantially C-shaped lever members, one such lever member 22 being illustrated in FIG. 2. The lever member 22 has first and second arm portions 24 and 26 interconnected at proximal ends thereof by a back portion 28. The lever member 22 is preferably molded as one-piece from flexible plastic material.

An inner circumferential surface 30 has a radius "r" equal to the radius of the disc-shaped recording media to be held therein, such as a CD, so that an outer circumferential edge of the CD is held on the inner circumferentially surface 30. The circumferential surface 30 subtends an angle greater than 180°, and has a diameter "d" which is substantially equal to that of the CD. By extending the surface 30 beyond 180° (or an arc length greater than about 1.57 radians) to points 32 and 34, the arm portions 24 and 26 flex radially outwardly in the direction "R" when a CD is axially inserted in the direction "A" between the arm portions 24 and 26. After a diametric center line of the CD passes points 32 and 34, the arm portions 24 and 26 begin to flex inwardly toward their original positions until the outer circumferential surface of the CD reaches the apex 36 of the inner circumferential surface 30.

The C-shaped lever member 22 avoids contacting the recorded surface of the CD. Small ledges 37 prevent the CD from twisting or moving radially outwardly after insertion between the arm portions 24 and 26.

The distance between the broken line "d" and "e" determines the amount of spring force generated by the outward movement of the arm portions 24 and 26. The spring force should be sufficient to prevent the CD from moving axially, but not so great as to place a destructive tension load on the arm portions 24 and 26, or the back portion 28.

A pivot hole 38 is formed at a corner between arm portion 24 and back portion 28 for pivotally mounting the lever member 22 on a pivot post (described later). An arcuate surface 40 is formed around the hole 38 and is provided with recesses 42 and 44 which are spaced at points along the arcuate surface 40 about 90° apart relative to the central axis of the hole 38. Each recess 42 and 44 has a rounded, convex surface which receives a spring-biased detent (described later). Engagement of a recess by the detent stops pivotal movement of the lever member 22 in either an open or closed position.

The distal ends 46 and 48 of the arm portions 24 and 26, respectively, project outwardly beyond ends of the inner circumferential surface 30 corresponding to points 32 and 34. Distal end 48 is spatulate in shape and cooperates with lock means (described later) to lock the lever member 22 in a closed position. A tab 50 is formed on the second arm portion 26 in a position not to obstruct adjacent tabs of adjacent lever membes. The tabs provide an indexing and pulling mechanism for selecting and retrieving one or more of the plurality of CD's stored in the housing. Tabs 50 can be appropriately numbered on the sides thereof for indexing purposes. An index label can be mounted on a recessed portion 11 of the end wall 12. The label contains information corresponding to the information placed on the tabs 50.

Figure 5:
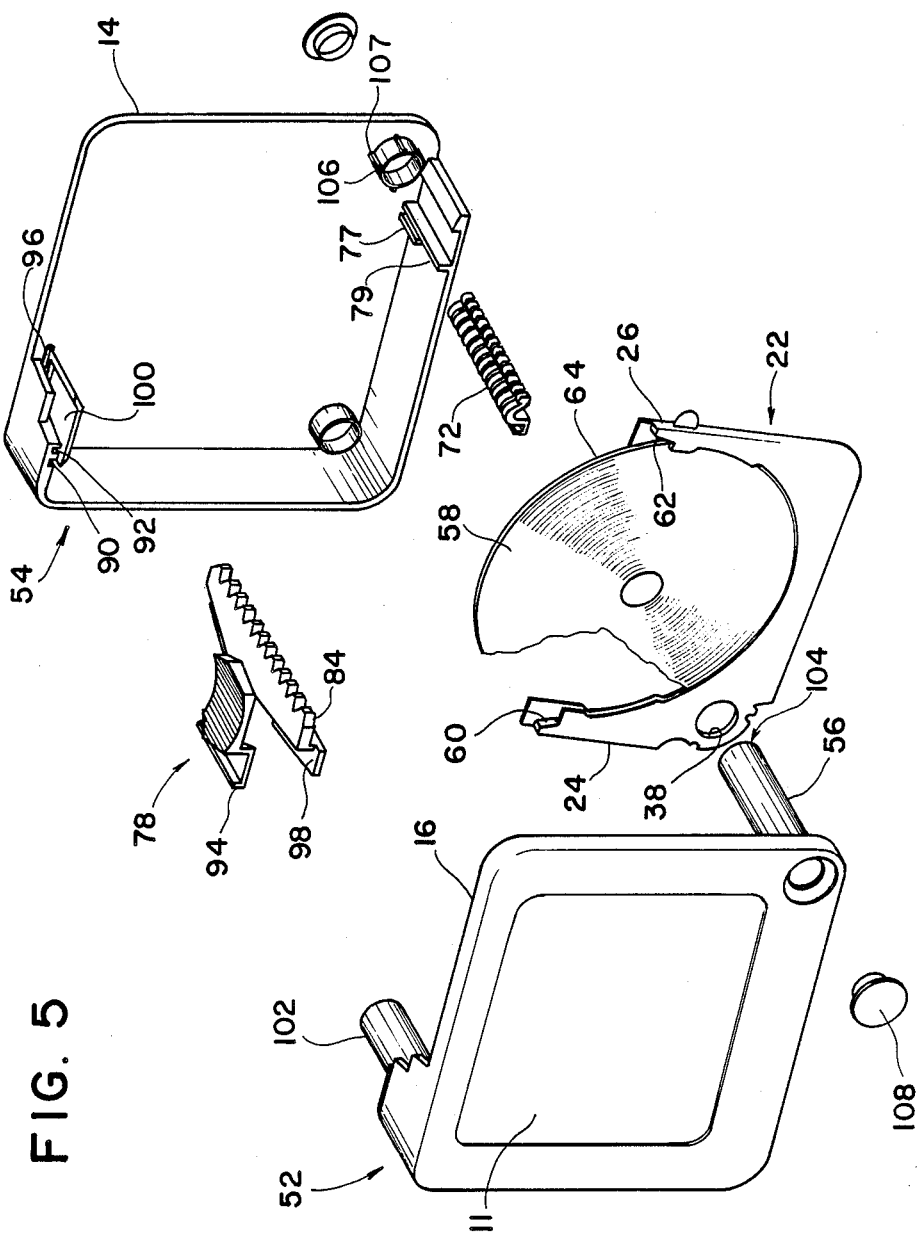
FIG. 5 is an exploded view of the recording media storage apparatus of FIG. 1.

Referring now to FIG. 5, the housing is an assembly of two shell halves 52 and 54. Shell half 52 includes end wall 16 while shell half 54 includes end wall 14. Side wall 20 spans two sides of the housing. A portion of the third side and a fourth side are open, thus defining an L-shaped opening which is closed (as seen in FIG. 1) when all lever members 22 are pivoted inwardly to a closed position.

A pivot post 56 extends between the end walls 14 and 16 of the housing, and passes through the hole 38 of each lever member 22 (only one illustrated) for pivotally mounting the same. Additional posts 102 may be provided in the housing for the purpose of interconnecting the two shell halves 52 and 54. The two shell halves 52 and 54 may be interconnected by having a distal end 104 of the posts press fitted into or over a cylindrical sleeve 106. Preferably, the cylindrical sleeve 106 and the post 56 are welded together in a sonic welding process, in which the lever members are first mounted on post 56, and then the shell halves 52 and 54 are brought together such that sleeve 106 is received inside the post 56. Splines 107 provided on the sleeve 106 provide a weld between sleeve 106 and post 56 after the sonic welder is energized. Plugs 108 cover openings which are formed as result of injection molding.

To load a CD 58 into a lever member 22, the lever member is pivoted outwardly of the housing, and the CD 58 is pushed axially inwardly between the arm portions 24 and 26. Cam surfaces 60 and 62 slope outwardly and guide the CD 58 using outer circumferentially edge 64 as the CD moves inwardly. As the outer circumferential edge 64 of the CD 58 slides over the cam surfaces 60 and 62, the arm portions flex radially outwardly as previously described.

Figure 6:
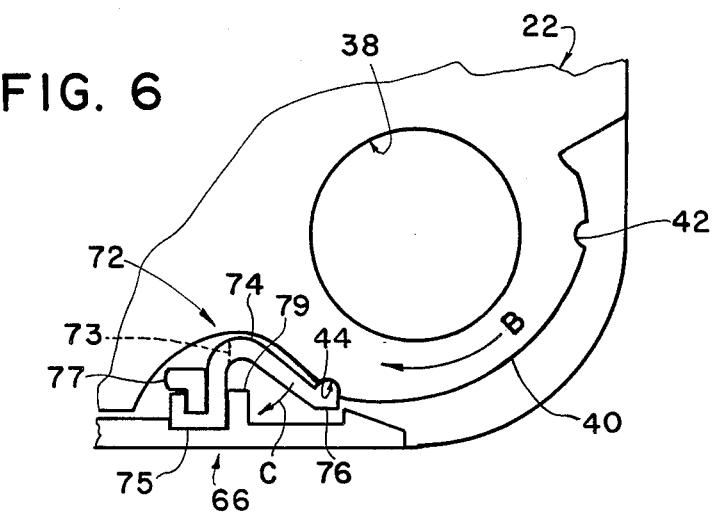
FIG. 6 is an enlarged plan view of a corner portion of the recording media lever member of FIG. 2.

Referring to FIG. 6, a detent mechanism 66 is used to hold the lever member 22 in either an open or closed position. In FIG. 6, the lever member 22 is shown in its fully closed position. The corner of the lever member in which the hole 38 is formed is provided with a substantially arcuate surface 40 in which first and second recesses 42 and 44 are formed. The recesses 42 and 44 coact with a spring detent 72 which includes a plurality of spring arms 74 having headed distal ends 76. The spring arms 74 correspond in number to the number of lever arms 22, each spring arm 74 being aligned with the recesses 42 and 44 of one of the lever members 22. The plurality of spring arms 74 are interconnected at 73 to a common base 75. The base 75 and the spring arms 74 are preferably molded as a single piece out of plastic material, so that the spring arms 74 flex inwardly to snap into engagement with the recesses 42 and 44.

The base 75 of the spring detent 72 is connected to the housing by sliding the base 75 between two abutments 77 and 79 which are formed integrally with the housing. The base 75 is inserted between the two abutment 77 and 79 prior to assembly of the two shell halves 52 and 54 of the housing.

The lever member 22 is illustrated in FIG. 6 in the closed position, in which the headed distal end 76 of the spring arm 74 engages the recess 44. In this position, the lever member 22 is prevented from inadvertently opening, even without the lock mechanism (to be described later). The engagement of the recess 44 and headed distal end 76 is released by applying a sufficient torque which causes the lever member 22 to pivot in the direction of arrow "B". The headed distal end 76 and the spring arm 74 are pressed inwardly in the direction of the arrow "C", thus developing a spring force which creates a spring force which biases the spring arm in the direction of recesses 42 and 44. A medial portion of the arcuate surface 40 may be provided with an increased radius (flatter profile) so as to minimize the spring force developed in the spring arms 74 at a mid point between the two recesses 42 and 44. This facilitates pivotal movement of the lever member 22 and reduces wear on the spring arms 74. When the lever member 22 has pivoted to an open position (as shown in FIG. 1), the headed distal end 76 of the spring arm 74 snaps into recess 42 to hold the lever member 22 in position. The spring detent 72 also provides means for preventing pivotal movement of one lever member from transferring to any one of the other lever members, thus inadvertently causing a non-selected lever member (or members) to move in or out of position.

Figure 7:
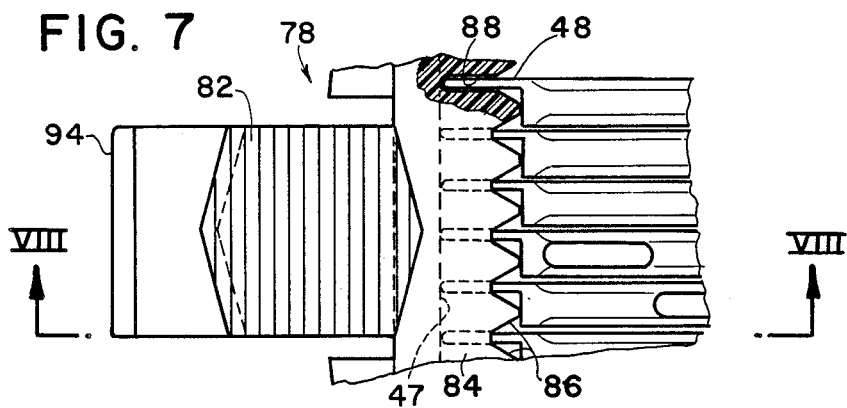
FIG. 7 is an enlarged, top plan view of a locking portion of the recording media storage apparatus of FIG. 1.
Figure 8:
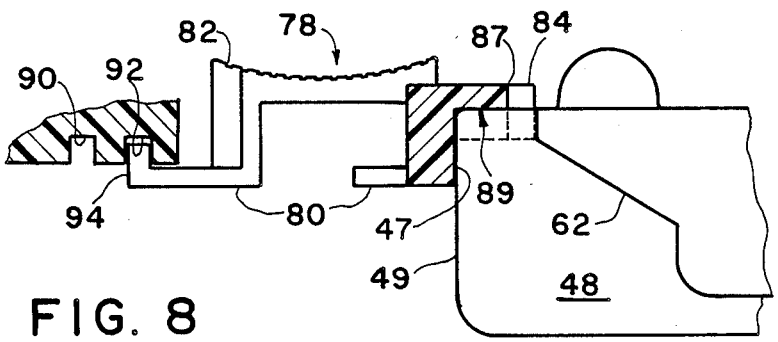
FIG. 8 is an enlarged, side elevational view, partially in section, of the portion illustrated in FIG. 7.

Referring to FIGS. 7 and 8, a lock mechanism 78 serves not only to lock the lever members 22 in the housing in the closed position but also to center the distal ends 48 of the arm portions 26 of the lever members 22 when in either the locked or unlocked position, and to seal the interior of the housing when in the locked position. The lock mechanism 78 slides axially along the housing. An upper part of the lock mechanism 78 is provided with a push button 82 for hand manipulation. A forward portion of the lock mechanism 78 is provided with saw-teeth 84 which have sloped surfaces 86. The sloped surfaces 86 act to guide the arm portion distal ends 48 which have a thin, spatulate shape. The lock mechanism 78 is illustrated in FIGS. 7 and 8 to be in the locked position, wherein the spatulate distal ends 48 are received in grooves 88 provided between the sawteeth 84. As seen in FIG. 8, an end face 49 of the distal end 48 abuts a vertical wall 47 of the lock mechanism 78 and a horizontal bottom 89 of the groove 88, thus preventing the lever member 22 from pivotally moving inwardly or outwardly. When the lock mechanism 78 is in the position illustrated in FIGS. 7 and 8, the interior of the housing is substantially sealed (gaps visible in FIG. 7 on opposite sides of individual sawteeth are exaggerated in orer to illustrate other features). Moreover, in the closed position, the lock mechanism 78 supports the distal ends 48 of the lever members 22 at an area diametrically opposite the pivotal connection, thereby providing a balanced alignment of the individual lever members. In the unlocked position, the lock mechanism 78 is moved rearwardly until the base 87 of the saw-teeth 84 is substantially coplanar with the end face 49 of the distal end 48. While the lever member 22 is free to pivot in the unlocked position (assuming sufficient torque is applied to overcome the detent mechanism), the saw-teeth 84 continue to align and support lever members which are in the unopened position by means of the end faces 49 of the distal ends 48 being positioned at the base 87 of the saw-teeth 84; thus, sloped surfaces 86 of the saw-teeth 84 act as guides for position of the distal ends of the arm portions.

Referring to FIG. 8, a portion of the housing adjacent the lock mechanism 78 is provided with grooves 90 and 92 which are adapted to engage a projection 94 of the lock mechanism 78. Engagement holds the lock mechanism 78 in either a locked or unlocked position. In order to move the lock mechanism 78 from the lock position to the unlocked position, for example, the lock mechanism 78 must first be depressed inwardly to disengage the projection 94 from the groove 92. Then, the lock mechanism 78 is moved axially in a rearward direction until the projection 94 is aligned with groove 90. By releasing the depressing force, the projection 94 springs upwardly into engagement with the groove 90.

Referring again to FIG. 5, the lock mechanism 78 is provided with opposite side, radially extending lips 98 (only one being visible in FIG. 5) which slide in grooves 96 provided in opposite sides of the housing. The lips 98 guide the lock mechanism 78 in its axial sliding movement. A planar surface 100 formed in the housing provides a stop which limits the downward movement of the lock mechanism 78 when depressed to disengage the grooves 90 and 92. Since the lock mechanism 78 is also made of plastic material, the rearward portion thereof is able to flex downwardly while the forward portion is held in the grooves 96.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

What is claimed:

1. An apparatus for storing a plurality of disc-shaped recording media, each having an outer circumferential edge, comprising;

portable housing means for securely housing and portably transporting the plurality of disc-shaped recording media;

holder means, pivotally connected to the housing, for holding the plurality of disc-shaped recording media by the outer circumferential edges thereof the holder means including a plurality of thin substantially C-shaped lever members formed of a flexible material, each having an inner circumferential surface for holding a disc-shaped recording media thereon, and each circumferential surface having a radius substantially equal to a radius of the disc-shaped recording media and a recording media insertion diameter smaller than the diameter of the disc-shaped recording media wherein the C-shaped lever member acts as a spring and flexes open when the disc-shaped recording media is inserted and securely holds the media therein upon insertion;

pivot means, disposed within the housing, for pivotally moving the holder means into and out of the housing; and lock means for locking the holder means in the housing.

2. An apparatus according to claim 1, wherein the inner circumferential surface of each C-shaped lever member subtends an angle greater than 180°.

3. An apparatus according to claim 2, wherein each C-shaped lever member has a back portion, and first and second arm portions which are flexible radially outwardly to receive the disc-shaped recording media being inserted therebetween on the inner circumferential edge.

4. An apparatus according to claim 3, wherein each arm portion of each C-shaped lever member has a distal end and a proximal end, the proximal ends of the first and second arms being interconnected through the back portion.

5. An apparatus according to claim 4, wherein the pivot means comprises a pivot post disposed within the housing and a hole provided in each lever member at a corner between the first arm portion and the back portion for receiving the pivot post, each lever member being pivotable between a fully open position and a fully closed position.

6. An apparatus according to claim 5, further comprising a pull tab extending outwardly from the second arm portion of each C-shaped lever member.

7. An apparatus according to claim 5, wherein the lock means comprises a lock slidably mounted on the housing adjacent the distal ends of the second arm portions of the C-shaped lever members and being slidable between locked and unlocked positions, the lock having saw-teeth provided on a forward portion thereof which center the distal ends of the second arm portions when the C-shaped lever members are in the fully closed position, and abuts the distal ends of the lever members when the sliding lock is in the locked position to prevent movement of the lever member.

8. An apparatus according to claim 7, wherein the lock is axially slidable along the housing into the locked and unlocked positions and has a projection provided on a rearward portion thereof which is disengaged to unlock the sliding bar by pressing the lock downwardly.

9. An apparatus according to claim 5, further comprising detent means, operatively connected to the C-shaped lever members, for positioning the C-shaped lever members in an open position and a closed position.

10. An apparatus according to claim 9, wherein each C-shaped lever member is arcuately shaped at the corner of the back and first arm portions wherein the arcuately shaped corner includes first and second recesses, and the detent means includes a plurality of spring arms snapping individually into engagement with the first and second recesses as each C-shaped lever member pivots to the open and closed positions.

11. An apparatus according to claim 13, wherein the plurality of spring arms are interconnected through a base connected to the housing, each spring arm having a headed distal end movable independently of each other into engagement with the recesses provided in the plurality of Cshaped lever members.

12. An apparatus according to claim 11, wherein the base and the plurality of spring arms comprise a one-piece member integrally formed of flexible plastic material.

13. An apparatus according to claim 1, further comprising detent means, operatively connected to the C-shaped lever members, for positioning the C-shaped lever members in an open position and a closed position.

14. An apparatus according to claim 13, wherein the detent means includes a spring detent having a plurality of spring arms, each of which individually snap into engagement with the plurality of C-shaped lever members, the spring arms providing means for preventing pivotal movement of one lever member from transferring to any of the remaining lever members.

15. An apparatus according to claim 1, wherein the housing is substantially rectangular in shape and has first and second opposite end walls and an L-shaped opening between the end walls through which the holder means pivots.

16. An apparatus according to claim 15, wherein the housing has four rounded corners, and the pivot means includes a pivot post extending between the opposite end walls of the housing at one of the corners thereof.

17. An apparatus according to claim 16, wherein the lock means comprises a slidable lock slidably supported on the housing near a corner which is diagonally opposite to the corner having the pivot post.

18. An apparatus according to claim 17, wherein each C-shaped lever member has first and second arm portions, each having a proximal end, and a back portion interconnecting the first and second arm portions at the proximal ends thereof.

19. An apparatus according to claim 18, wherein the slidable lock has a forward portion having a plurality of saw-teeth and a groove between each saw-tooth which receives the distal ends of the C-shaped lever members when the slidable lock is placed in a locking position.

20. An apparatus according to claim 19, wherein the slidable lock has a projection which extends in a direction transverse the direction of sliding movement of the sliding bar, the projection being disengaged by passing the sliding lock downwardly into the housing.

21. An apparatus according to claim 1, wherein the lock means comprises a sliding lock having saw-teeth provided on a forward portion thereof which engage the distal ends of the C-shaped lever members therebetween.

22. An apparatus according to claim 21, further comprising grooves provided between each two adjacent saw-teeth, each groove opening downwardly and slidably receiving the distal end of one of the C-shaped lever members.

23. An apparatus according to claim 22, wherein the sliding lock has a projection formed on a rearward portion thereof, and the housing is provided with first and second grooves which engage the projection to hold the sliding lock in a lock and unlocked position, respectively.

24. An apparatus according to claim 23, wherein the projection extends upwardly into the first and second grooves, and the sliding lock is movable downwardly to disengage the projection from the first and second grooves to allow movement of the sliding lock between the locked and unlocked positions.

25. An apparatus according to claim 1, wherein each C-shaped lever member is a one-piece member made of flexible plastic material.

26. An apparatus for storing a plurality of disc-shaped recording media, each having an outer circumferential edge, comprising:

a housing;

holder means, pivotally connected to the housing, for holding the plurality of disc-shaped recording media by the outer circumferential edges thereof, wherein the holder means includes a plurality of thin, substantially C-shaped lever members, each lever member having first and second arm portions, and each arm portion having a distal end;

pivot means, disposed within the housing, for pivotally moving the holder means into and out of the housing; and lock means for locking the holder means in the housing, wherein the lock means includes a sliding lock having saw-teeth provided on a forward portion thereof which engage the distal ends of the C-shaped lever members therebetween.

27. An apparatus according to claim 26, wherein the sliding lock include grooves provided between each two adjacent saw-teeth, each groove opening downwardly and slidable receiving the distal end of one of the C-shaped lever members.

28. An apparatus according to claim 27, wherein the sliding lock has a projection formed on a rearward portion thereof, and the housing is provided with first and second grooves which engage the projection to hold the sliding lock in a lock and unlocked position, respectively.

29. An apparatus according to claim 28, wherein the projection extends upwardly into the first and second grooves, and the sliding lock is movable downwardly to disengage the projection from the first and second grooves to allow movement of the sliding lock between the locked and unlocked positions.

30. An apparatus according to claim 26, wherein the sliding lock is a one piece member.

31. An apparatus for storing a plurality of disc-shaped recording media, each having an outer circumferential edge, comprising:

a housing;

holder means, pivotally connected to the housing, for holding the plurality of disc-shaped recording media by the outer circumferential edges thereof, wherein the holder means includes a plurality of thin, substantially C-shaped lever members, each lever member having first and second arm portions, and each arm portion having a distal end;

pivot means, disposed within the housing, for pivotally moving the holder means into and out of the housing;

lock means for locking the holder means in the housing; and detent means, operatively connected to the C-shaped lever members for positioning the C-shaped lever members in an open position and a closed position, wherein the detent means includes a spring detent having a plurality of spring arms snapped nnto engagement with the plurality of C-shaped lever members, the spring arms being separately and independently movable into engagement with corresponding C-shaped lever members for positioning the individual C-shaped lever member in its open position or its closed position.

32. An apparatus according to claim 31, wherein the spring arms provide means for preventing pivotal movement of one lever member from transferring to any one of the remaining lever members.

33. An apparatus according to claim 31, wherein the spring detent is a one-piece member formed of a flexible plastic material.

34. An apparatus according to claim 31, wherein each C-sahped lever member has a back portion, and first and second arm positions which are flexible radially outwardly to receive the disc-shaped recording media and wherein the lever member is arcuately shaped at the corner of the back and first arm portions, the arcuately shaped corner including first and second recesses and the plurality of spring arms snapping individually into engagement with the first and second recesses as each C-shaped lever member pivots to the open and closed positions.

35. An apparatus according to claim 34, wherein the plurality of spring arms are interconnected through a base connected to the housing, each spring arm having a headed distal end movable independently of each other into engagement with the recesses provided in the plurality of C-sahped lever members.

36. An apparatus according to claim 35, wherein the base and the plurality of spring arms comprise a one-piece member integrally formed of flexible plastic material.

* * * * *